US008045564B2

(12) United States Patent
Culbreth et al.

(10) Patent No.: US 8,045,564 B2
(45) Date of Patent: Oct. 25, 2011

(54) PROTOCOL-LEVEL FILTERING

(75) Inventors: Aaron Culbreth, Bellevue, WA (US);
Brian L. Trenbeath, Redmond, WA (US); Keumars A. Ahdieh, Lake Stevens, WA (US); Peter M. Wiest, Issaquah, WA (US); Roger H. Wynn, Redmond, WA (US); Stan D. Pennington, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 1080 days.

(21) Appl. No.: 11/325,722

(22) Filed: Jan. 5, 2006

(65) Prior Publication Data

US 2007/0058668 A1    Mar. 15, 2007

Related U.S. Application Data

(60) Provisional application No. 60/716,294, filed on Sep. 12, 2005, provisional application No. 60/716,062, filed on Sep. 12, 2005.

(51) Int. Cl.
*H04L 12/56*    (2006.01)

(52) U.S. Cl. .................. 370/395.5; 370/230.1; 370/231; 370/235; 370/252; 370/466; 370/467; 370/469; 709/224; 709/236; 711/147; 711/148; 711/149; 711/150; 711/151; 711/152; 711/153; 711/168; 713/151; 713/154

(58) Field of Classification Search ............... 370/230.1, 370/469, 395.5, 466, 467, 231, 235, 252; 713/151, 154; 709/224, 236; 711/147–153, 711/168
See application file for complete search history.

(56) References Cited

U.S. PATENT DOCUMENTS

| 6,233,618 B1 | 5/2001 | Shannon ....................... 709/229 |
| 6,570,884 B1 * | 5/2003 | Connery et al. .............. 370/419 |
| 6,591,304 B1 | 7/2003 | Sitaraman et al. ............ 709/238 |
| 6,615,266 B1 | 9/2003 | Hoffman, Jr. et al. ........ 709/227 |

(Continued)

FOREIGN PATENT DOCUMENTS

WO    WO2005/071518 A1    8/2005

OTHER PUBLICATIONS

Parental control—content filtering, *Parental Control Software*, downloaded Sep. 16, 2005, http://www.legend.co.uk/home/internet_security/internet_filter.php, 1 page.

(Continued)

*Primary Examiner* — Aung S Moe
*Assistant Examiner* — Hoon J Chung
(74) *Attorney, Agent, or Firm* — Woodcock Washburn LLP

(57) ABSTRACT

Mechanisms are disclosed for detecting protocols independently of the ports used by streams associated with the protocols or applications that may send out such streams. The detecting may entail using a content filter that is hosted on a networking stack, where the content filter may be composed of a stream buffer and handlers for detecting the protocols. The handlers may be further used to modify streams incoming to a port or streams outgoing from an application. The handlers can modify the streams in a variety of ways, including reading, inserting, replacing, deleting, and completing data in the streams according to some policy criteria, such as those set by parental controls. Individual handlers may be selected from a plurality or set of handlers so that they can be matched up to the appropriate streams.

20 Claims, 9 Drawing Sheets

U.S. PATENT DOCUMENTS

| | | | |
|---|---|---|---|
| 6,772,214 B1* | 8/2004 | McClain et al. | 709/229 |
| 6,772,345 B1* | 8/2004 | Shetty | 726/24 |
| 6,915,437 B2 | 7/2005 | Swander et al. | 713/201 |
| 6,963,913 B2* | 11/2005 | Komisky | 709/225 |
| 7,461,403 B1* | 12/2008 | Libenzi et al. | 726/24 |
| 2002/0128061 A1 | 9/2002 | Blanco | 463/29 |
| 2003/0105863 A1 | 6/2003 | Hegli et al. | 709/225 |
| 2004/0034703 A1* | 2/2004 | Phadke | 709/224 |
| 2004/0040034 A1 | 2/2004 | Sullivan et al. | 725/25 |
| 2004/0123135 A1 | 6/2004 | Goddard | 713/200 |
| 2004/0123327 A1 | 6/2004 | Fai Ma et al. | 725/100 |
| 2004/0205334 A1* | 10/2004 | Rennels | 713/154 |
| 2005/0141557 A1* | 6/2005 | Bradac | 370/469 |
| 2005/0144277 A1 | 6/2005 | Flurry et al. | 709/225 |
| 2007/0067450 A1* | 3/2007 | Malloy et al. | 709/224 |

OTHER PUBLICATIONS

CYBERsitter for a family friendly internet, *CYBERsitter-Advanced Features*, downloaded Sep. 16, 2005, http://www.cybersitter.com/advanced.htm, 2 pages.

ContentWatch: contentProtect Internet Filter, Contentprotect™, downloaded Sep. 16, 2005, 3 pages.

iLumin Assentor Compliance 3.3, *Info World*, Jun. 20, 2005, http://www.vontu.com/uploadedFiles/InfoWorld_DLP_0605H.pdf, 31-45.

\* cited by examiner

PROTOCOL-LEVEL FILTERING

CROSS-REFERENCE TO RELATED APPLICATIONS

This application claims benefit to application Ser. No. 60/716,294, filed Sep. 12, 2005, titled "Protocol-Level Filtering". This application is also related to application Ser. No. 11/266,143, filed Nov. 3, 2005, titled "Compliance Interface For Compliant Applications; and application Ser. No. 60/716, 062, filed Sep. 12, 2005, titled "Internet Content Filtering", and its non-provisional counterpart bearing the same title, application Ser. No. 11/326,284, filed on Jan. 4, 2006.

BACKGROUND

Current content filtering mechanisms, such as those based on parental controls, may use network protocol detection and manipulation that is port and/or application specific. In such a set-up, assumptions can be made regarding content filtering based on the type of application a user is using, or a designated port that is being used for sending and/or receiving data. Thus, if a user is using a web browsing application, for instance, an assumption can be made that the protocol may be HTTP (Hypertext Transfer Protocol) or FTP (File Transfer Protocol). Similarly, if some specific port is being used to send and receive data subscribing to a specific protocol, such as HTTP or FTP, an assumption can be made that any current or future traffic sent through this port will subscribe to the same protocol used in the past.

However, it would be advantageous to provide mechanisms that allow for protocol-level content filtering at least in an application and port agnostic manner-which may allow for a more complete solution for protocol filtering, given that any instance of a protocol can be handled that either enters or exists at a system. Moreover, it would be advantageous to provide mechanisms that can handle multiple protocol detection and manipulation scenarios.

SUMMARY

Various mechanisms are provided that allow for protocol-level content filtering in at least a port and application agnostic manner. For instance, protocol detection components, such as protocol handlers, are able to identify protocols associated with some data streams. Such handlers may work in concert with data stream buffers to identify any given incoming or outgoing data stream from a computing system. These handlers may identify the protocols by being part of content filters that may reside on networking stacks.

Upon determination of any given protocols, the handlers can modify the associated data streams in a variety of ways, per policies set out by policy services. For example, the handlers can delete data in the data stream, insert data into those streams, or replace such data. Such modifications can be performed with the aid of data stream markers and handler interfaces. In the end, the handlers, representing a part of content filtering mechanisms, can allow for the filtering of content at the protocol level.

It should be noted, that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following FIGS. are included.

DETAILED DESCRIPTION

Overview

Protocol-level filtering may comprise of various aspects. In this Detailed Description, an overview of the general architecture is considered in the first two FIGS., FIGS. 1 and 2, and thereafter various specific components and areas of the architecture are considered in FIGS. 3-8. Lastly, in FIG. 9, an exemplary implementation is considered. In short, these figures and the discussion below disclose how protocols associated with data streams are identified, and how such data streams may be modified.

Aspects of Protocol-Level Filtering

Figure 1:
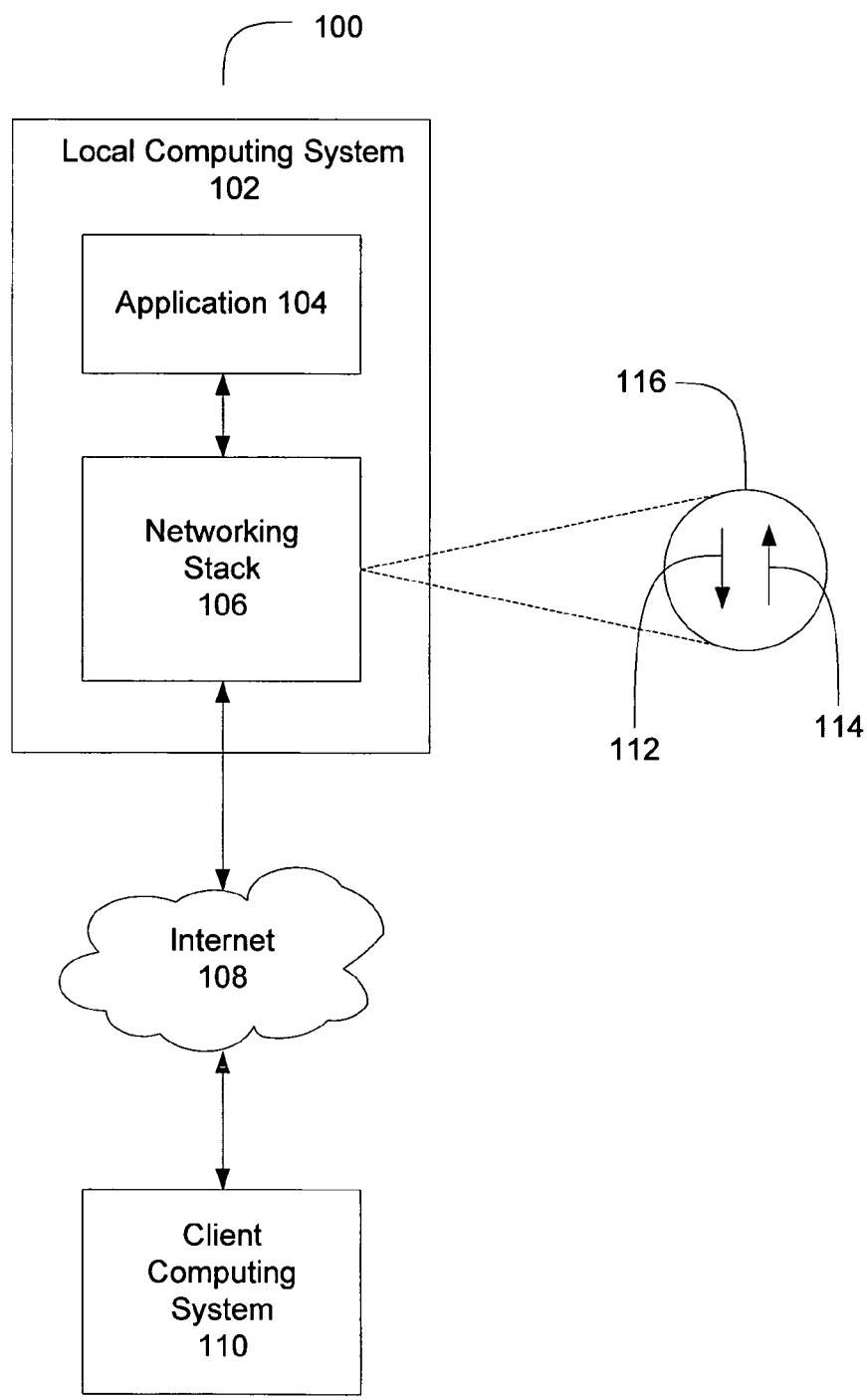
FIG. 1 illustrates a general architecture of protocol-level content filtering.

FIG. 1 illustrates one exemplary architecture 100 where protocol-level filtering may be used. Per FIG. 1, a local computing system 102 may have an application 104 running on it. The local computing system 102 may be a personal computer (PC), a hand-held device, and so on. The application 104 may be any computer executable application, such as a web browser. When the application 104 wants to communicate with other computing systems 110 via the internet 108, it may do so using a networking stack 106.

In one aspect of the presently disclosed subject matter, data traffic 112 and 114 can be monitored 116 via a content filter (shown in the next FIG.). Both data incoming 114 from the internet (or intranet, for that matter) 108, and data outgoing 112 from the application 104, can be monitored 116. Such monitoring may entail the determining of the type of protocol that is used by the data (or data stream, in some implementations). Thus, for example, if some client computing system 110 requests data from the application 104, the request may be monitored as incoming data 114 to the application, and a response by the application 104 may be monitored as outgoing data 112. It should be noted, that "data" is used in the present disclosure as one type of "information" that can be trafficking between a local computing system 102 and some client computing system 110—other types of information, such as "code" can also be exchanged between these computing systems 102 and 110.

Moreover, the illustrated local computing system 102 and the client computing system 110 are also merely exemplary, since other computing systems, such as client servers, proxy servers, hand-held computing system, etc. can also be involved. Furthermore, such involvement can be spread out across a plurality of distributed (or non-distributed) computing systems.

The illustrated monitoring 116 extends to not only the determination of the protocol used by data traffic 112 and 114, but also to the manipulation of such traffic 112 and 114. Thus, in another aspect of the presently disclosed subject matter, either incoming or outgoing data can be read by some protocol detection component, or additional data can be inserted into the trafficking data stream, or deleted from the stream, or replaced in the stream.

Additionally, the stream may also be completed in the sense that the stream has enough data for a positive identification of the protocol used by the steam. This means that a few packets in the stream may need to be released if they don't provide useful identification information (because, for example, other protocols may use the same few packets, and so an individualized identification cannot be made based on these packets), and the once enough identification-wise useful data is gathered, for example, in a stream buffer, the protocol of data may be identified.

Moreover, this also means that if a protocol detection component, such as a handler, uses completes the stream, it may also claim ownership of the stream so that all other potential handlers are removed from consideration. More detail is provided below regarding the identification of protocols and the manipulation of the associated data.

Figure 2:
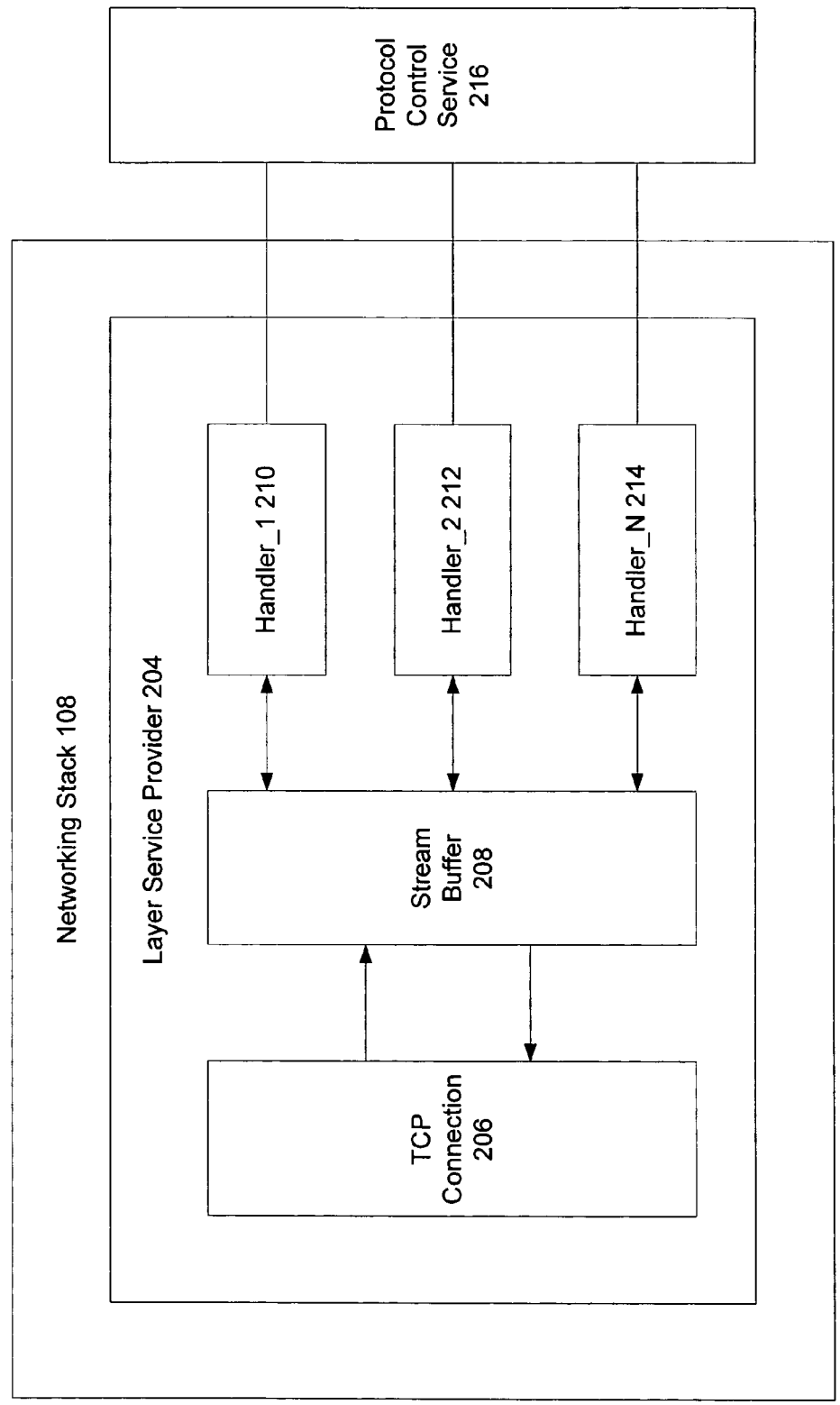
FIG. 2 focuses on the networking stack of the protocol-level content filtering architecture, and specifically on the content filter that is hosted by the networking stack and the various components of the content filter.

FIG. 2 focuses on the components of the networking stack 108 depicted in FIG. 1, and the content filter that is hosted on the stack 108. Thus, the networking stack 108 may have a content filter, such as a resident layer service provider 204 (or extension thereof). This provider 204 can sit anywhere in the stack 108, and in the illustrated implementation it may be located near the top of the stack 108. The networking stack 108 may host the layer service provider 204 in each process that uses it. However, if increased security and anti-hacking concerns are present, such a provider 204, whether in the form of transport driver interface (TDI) or a firewall or a proxy, could be easily located nearer the bottom of the networking stack 108.

Once the layer service provider 204 is set-up, it may implement an interface between any set or a plurality of protocol handlers 210, 212, 214 (or just "handlers") and the networking stack 108. The provider 204 may also function as the main interception point of stream data. In other words, it may function as a hook into the network stack that allows for the interception of network traffic.

The layer service provider 204 may also see each TCP (transmission control protocol) 206 that is established between computing systems. In so doing, the provider 204 may generate context information for the connection 206. This context information can maintain which handlers 210, 212, 214, are processing a stream. Furthermore, it may also implement a stream buffer 208 so that selected data may be buffered. Such buffering may be performed for a variety of reasons, such as to give the handlers 210, 212, 214 enough time to positively identify a protocol associated with a stream, or to give the handlers 210, 212, 214 the opportunity to manipulate a data stream associated with the TCP connection 206.

The steam buffer 208 may be an object that abstracts some or all of the operations that the handlers 210, 212, 214 may use, such as a read operation, delete operation, insert operation, replace operation, and complete operation (as discussed above). Of course, those of ordinary skill in the art will recognize other additional operations that may be used with association with the stream buffer, or any buffer for that matter.

The handlers 210, 212, 214 may be protocol specific objects that know how to find and manipulate data traffic. In other words, they may specialize in identifying and manipulating the data traffic. In so doing these handlers 210, 212, 214 may determine if a specific piece of traffic is to be allowed or blocked. As indicated above already, any number of handlers can be provided, whether one handler, a set of handlers, or a great plurality of handlers. For example, a handler can be provided that knows how to handle a data stream that subscribes to HTTP; another handler can be provided that knows how to handle a data stream that subscribes to FTP; yet another handler can be provided that knows how to handle a data stream that subscribes to SMTP (Simple Mail Transfer Protocol), and so on.

Furthermore, a protocol control service 216 may be used in conjunction with aforementioned components of the layer service provider 204, such that the protocol control service 216 may communicate policies with the handlers 210, 212, 214. Such policies may be set by some users or administrators of the computing system 102 where the networking stack 108 resides. These policies associated with the protocol control service 216 may allow some content in a data stream to pass through, and block other content—whether the content is embodied in incoming or outgoing traffic.

Thus, in short, the layer service provider 204 can manage the protocol handlers 210, 212, 214 by handling all the networking stack 108 integration, synchronization, and buffering aspects. If, for example, there may be any handlers 210, 212, 214 viewing a connection 206, all data stream packet processing will be synchronized by the layer service provider 204. Furthermore, if, for instance, all the handlers disclaim a data stream, then the layer service provider 204 will process all incoming and/or outgoing data asynchronously to enable maximum performance.

Figure 3:
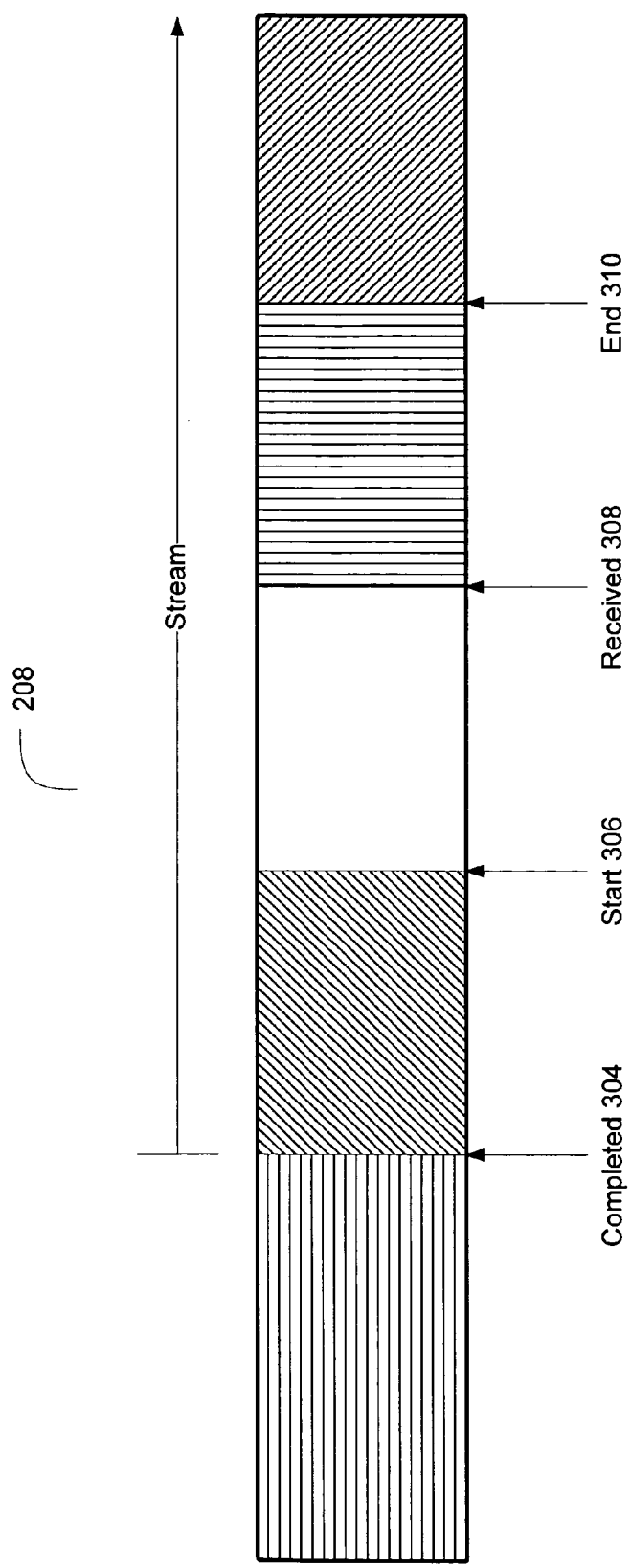
FIG. 3 illustrates a stream buffer of the content filter, and the various markers that may accompany the stream buffer.

FIG. 3 depicts in detail various specific aspects of the stream buffer 208 depicted in FIG. 2. When a piece of data is received from outside a computing system, for example, via the internet, or when it is generated by an application internal to the computing system, the aforementioned layer service provider 204 may process the data either by absorbing it or passing it through. In the former case, data may be absorbed or buffered in a stream buffer—whether it is incoming or outgoing data.

The stream buffer 208 may use buffer markers to organize an incoming or outgoing data stream. Such markers may be used by the aforementioned protocol handlers 210, 212, 214 to find the beginning and end of each piece of data that is relevant to content filtering. For example, a "completed" marker 304 may be used to identify the beginning of the portion of the stream buffer 208 that has been marked as completed. This means that the completed data is ready to be sent on through the layer service provider 204.

A "start" marker 306 may be used to signify that this is the beginning of the buffered data. This buffered data may contain currently received data and received data from a previous call. A "received" marker 308 may be used to mark the beginning of the last-most received data. This may allow protocol handlers to know which data is "new" even if the handlers have to process a lot of data that has been buffered up already.

Finally, an "end" marker may be used to mark the current end of the buffer where new data is added for handlers to inspect. As those of ordinary skill in the art will appreciate, other markers that will aid in the processing of information, in a general sense, and the processing of filtered content, specifically, may also be used.

Figure 4:
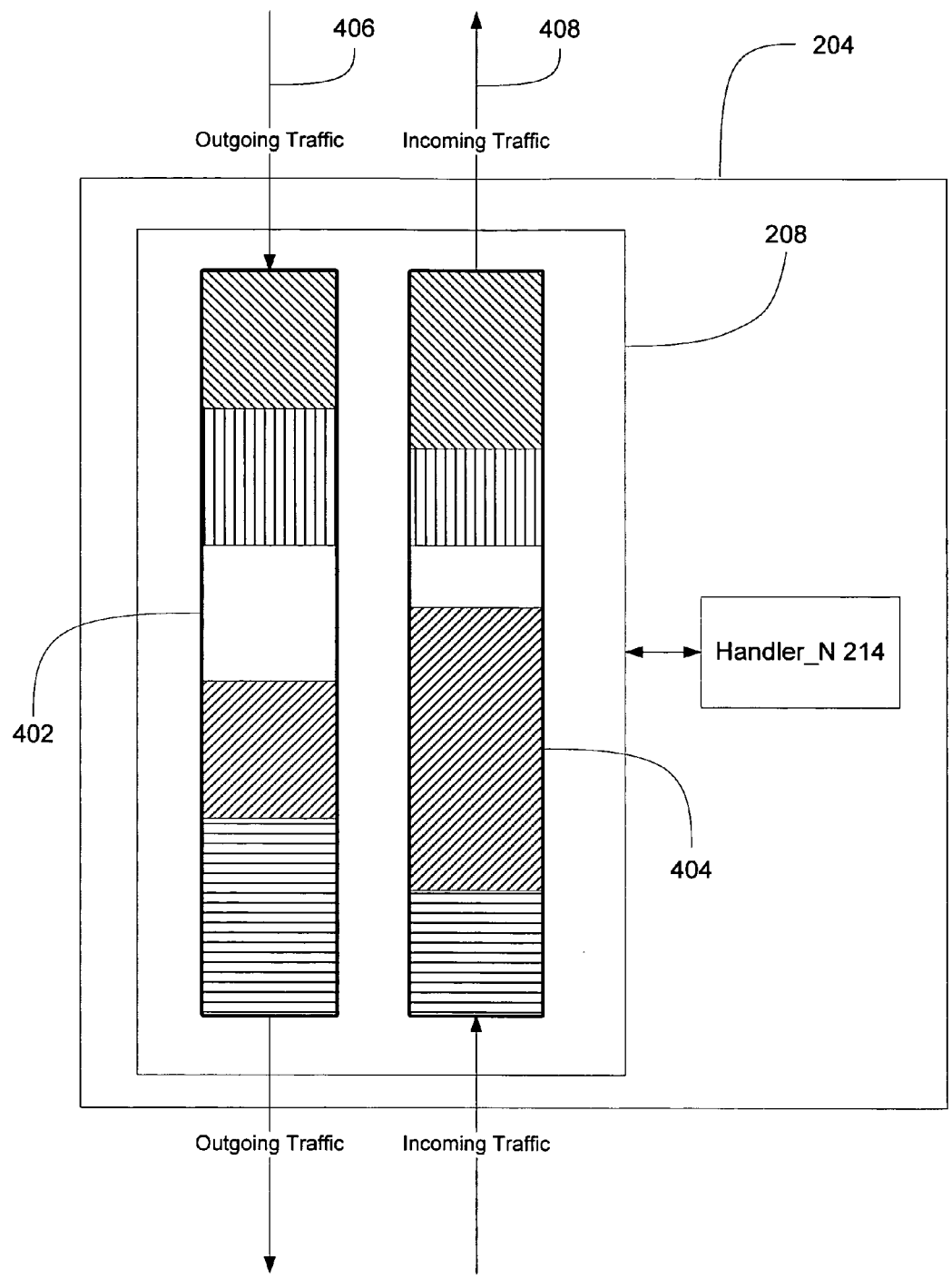
FIG. 4 shows that the stream buffer may not only handle incoming traffic data but also outgoing traffic data.

FIG. 4 illustrates that the buffers discussed in FIG. 3 may be implemented separately for incoming 408 and outgoing 406 data traffic. Thus, FIG. 4 depicts outgoing traffic 406 from an application (shown in FIG. 1), where the traffic is buffered in an outgoing data stream buffer 402. Likewise, incoming traffic 408 is depicted, where the incoming traffic 408 is buffered in an incoming data stream buffer 404. Some hander 214, may then have access to either buffer 402 or 404 so that it can identify the protocol associated with the respective outgoing 406 or incoming traffic 408, and have the opportunity to manipulate the data stored in the buffers 402 and 404.

Figure 5:
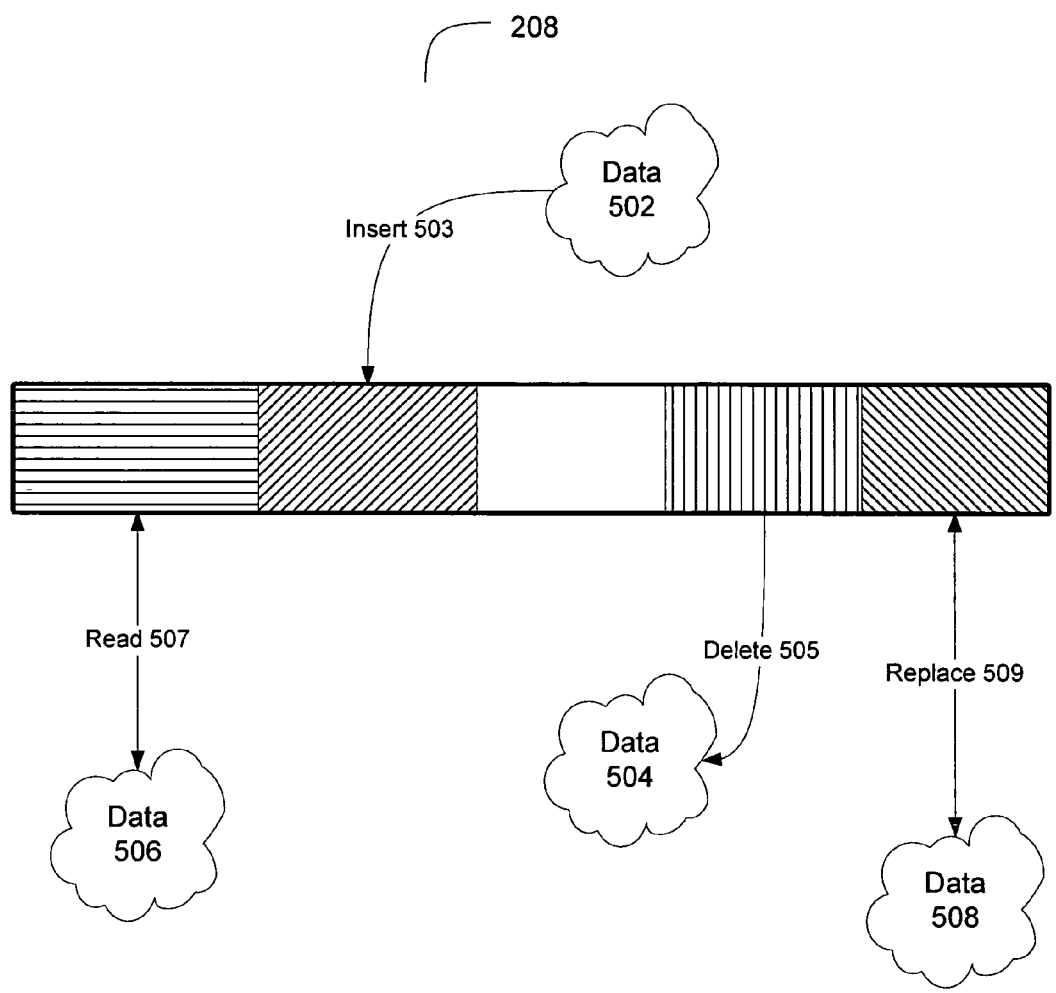
FIG. 5 illustrates a variety of operations that may be performed on the stream buffer subject to modifying the stream buffer according to some filtering policy.

FIG. 5 illustrates the type of operations that may be performed on a data stream buffer 208. A data stream may have a variety of operations that the protocol handlers can use, of which only an exemplary sample is disclosed—those of skill in the art will appreciate other such operations. These operations may allow the protocol handlers to manipulate the data stream without needing to directly work with data stream buffer.

For example, one operation might provide a "Read" functionality 507, as discussed above, where some data 506 is read from the stream buffer 208. Specifically, such an operation may be implemented as: Read (int nStart, int nLen). This operation may return nLen bytes of data starting at the nStart offset in the buffer. nStart can be indexed beginning at the "Start" marker, as discussed with respect to FIG. 3.

Another operation that may be provided is the "Insert" operation 503, such as Insert (int nIndex, BYTE * pBytes, int nLen), that may insert some data 502 into the stream buffer 208. Specifically, this operation may insert nLen bytes (pBytes) at nIndex from the "Start" marker. This will then push all the rest of the data back. If nIndex is before the "Received" marker, "Received" may then be moved back nLen to compensate.

Another operation may be the "Replace" operation 509, Replace (int nIndex, BYTE * pBytes, int nLen), which may replace nLen bytes (pBytes) at nIndex from the "Start" marker. Furthermore, a "Delete" operation 505 could also be provided, Delete (int nIndex, int nLen), which may remove nBytes from the stream at nIndex. There may also be a "Complete" operation (not shown), Complete (int nLen), which completes nLen bytes starting at the "Start" marker. In one aspect of this disclosure, if a protocol handler calls this operation, it may also claim ownership of the stream, and this may allow for the removal of all the other potential handlers.

Figure 6:
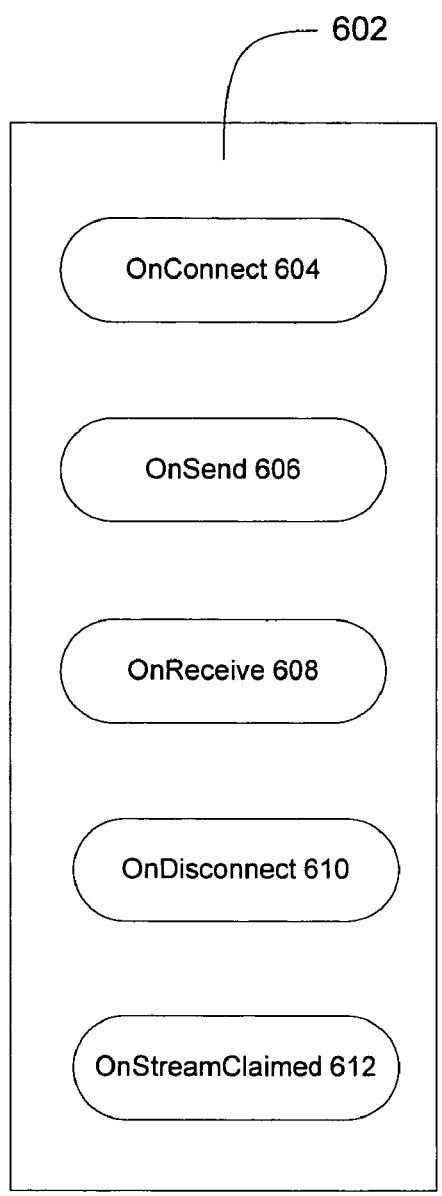
FIG. 6 illustrates a variety of protocol handler interfaces.
Figure 7:
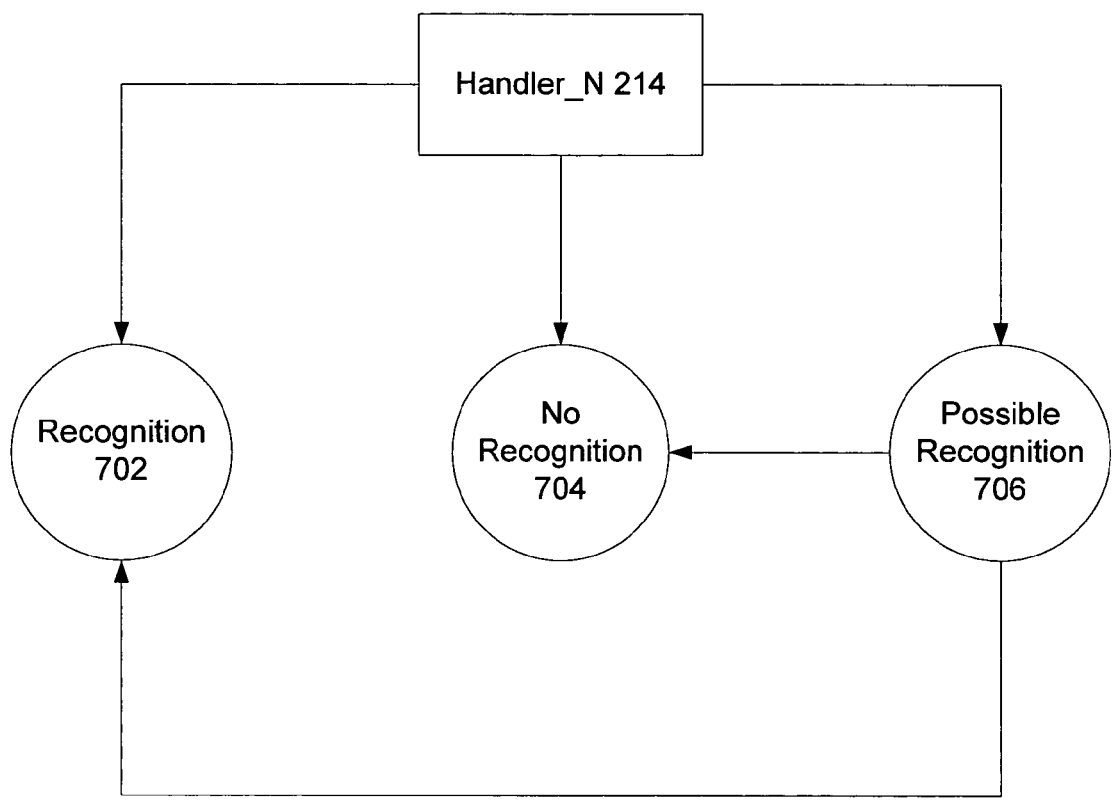
FIG. 7 illustrates the various states of a typical handler, when the handler is in the process of identifying a protocol associated with a data stream.

Next, FIGS. 6 and 7 illustrate various aspects of typical protocol handlers. The protocol handlers may encapsulate the parsing and applying of parental control policies for a given protocol such as HTTP, FTP, SMTP, etc. As discussed above, the handlers can be managed via the layer service provider in terms of being created, destroyed, and sent new stream data. The protocol handlers may work with the stream buffer to view and manipulate the network traffic.

In one aspect, in FIG. 6, a protocol handler interface 602 is illustrated. The protocol handler interface 602 may provide various interfaces that perform specified functions. It should be noted that the illustrated interfaces 604, 606, 608, 610, and 612 are merely exemplary and not limiting.

For example, regarding the OnConnect interface 604, it may be called when a new transmission control protocol connection, such as connection 206 depicted in FIG. 2, is established. In a scenario where a handler may not care to even look at traffic data for this connection, it can say so at this point. Next, an OnSend interface 606 may be provided. This interface 606 may be called when data is sent from an application. A call to this interface 606 may involve a stream buffer for both the incoming and outgoing streams. Similarly, an OnReceive interface 608 may be provided, which may be called when data is sent to an application (as opposed to being sent from an application, as in the OnSend interface 606 scenario). This call may also include the stream buffer for both the incoming and outgoing streams. In both the OnReceive 608 and OnSend 606 scenarios, any given handler may have the option to remove its self from the connection.

Additionally, an OnDisconnect interface 610 may be provided. This interface 610 may be called when the connection is lost. This is to give the handler a chance to clean up any allocated data or complete any outstanding asynchronous operations. Lastly, an OnStreamClaimed interface 612 may be provided. This interface 612 may be called when another protocol handler has claimed the stream. As before, this is to give the handler a chance to clean up any allocated data or complete any outstanding asynchronous operations.

FIG. 7 illustrates the various states that a handler may find itself in. A typical handler 214, when attempting to recognize a protocol associated with a data stream may either recognize 702 the protocol, not recognize it 704, or it may delay temporarily the recognition 706 of the protocol subject to obtaining more data. When enough data is obtained, the possible recognition state 706 may revert to a positive recognition 702 of a protocol or a positive conclusion that it the handler 214 does not recognize the protocol.

In fact, there may be myriad of algorithms that are used in the process of recognizing incoming or outgoing data stream-associated protocols. In one aspect of the presently disclosed subject matter, when a new connection is established, protocol determination may use a "greedy" algorithm. In other words, the first handler that identifies the data stream to be using their protocol wins. For example, the following algorithm may be used:

```
ON new TCP Connection
    FOR EACH registered handler
        Create new Handler instance
    NEXT
END
ON new data
    // If there are no attached handlers to the current connection
    // just pass the data through as fast as possible
    IF Count(Handlers) == 0 THEN
        Pass data through LSP
    // if there is one handler attached, send it the data directly
    // NOTE: this is assuming the 1 handler has indicated a positive
    // match to the current connection
    ELSE IF Count(Handlers) == 1
        Send data to handler
    // At this point, no handlers have identified themselves as an
    // owner of this stream. Send the data to all the remaining handlers
    // and let them see if they can determine if they are the appropriate
    // handler.
    ELSE IF Count(Handlers) > 1
        // Send data to each handler
        FOR EACH Handler H
            Send data to H
            SWITCH Response(H)
                // This handler has determined it is the correct owner
                // for this connection
                CASE Positive Match
                    FOR EACH Handler != H
                        Disconnect Handler from Stream
```

```
            NEXT
                // This handler has determined it is NOT a possible
                // owner for this connection.
                CASE Negative Match
                    Disconnect Handler from Stream
                // This handler is unable to determine definitively if
                // this connection is a protocol it handles.
                CASE No Deterministic Match
                    Continue
            END SWITCH
        NEXT Handler
    END IF
END ON new data
```

Of course, this is merely an exemplary algorithm, and those of skill in the art would readily appreciate other appropriate algorithms that could allow a handler or a set of handlers to identify any given protocol, originating from any given port or application.

Figure 8:
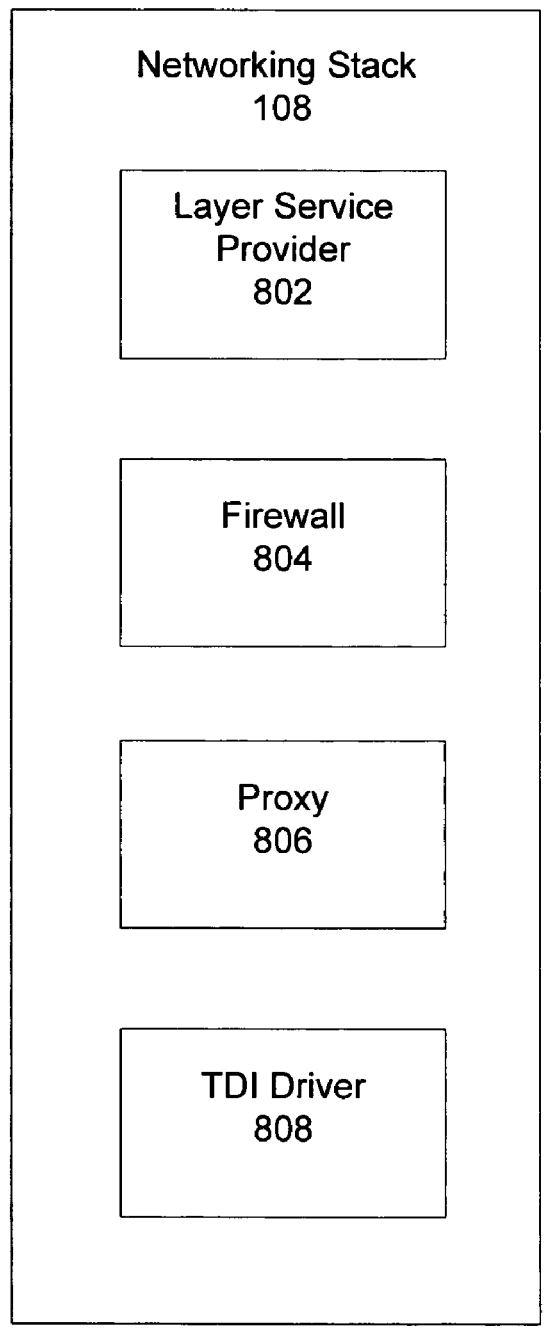
FIG. 8 shows that a content filter, however embodied in various modules, may reside just about anywhere on a networking stack.

Next, FIG. 8 illustrates a notion mentioned above already, namely, that the location of a content filter could be just about anywhere on the networking stack 108. In one implementation, the layer service provider 802 is placed near the top of the networking stack 108. Other components which could manage the stream buffer and the handlers, such as a firewall 804, a proxy 806, or a TDI Driver 808 can be placed variously along the stack. The higher up implementation may be more easily implemented, but lower level networking stack 108 implementations are also contemplated by the presently disclosed subject matter.

Figure 9:
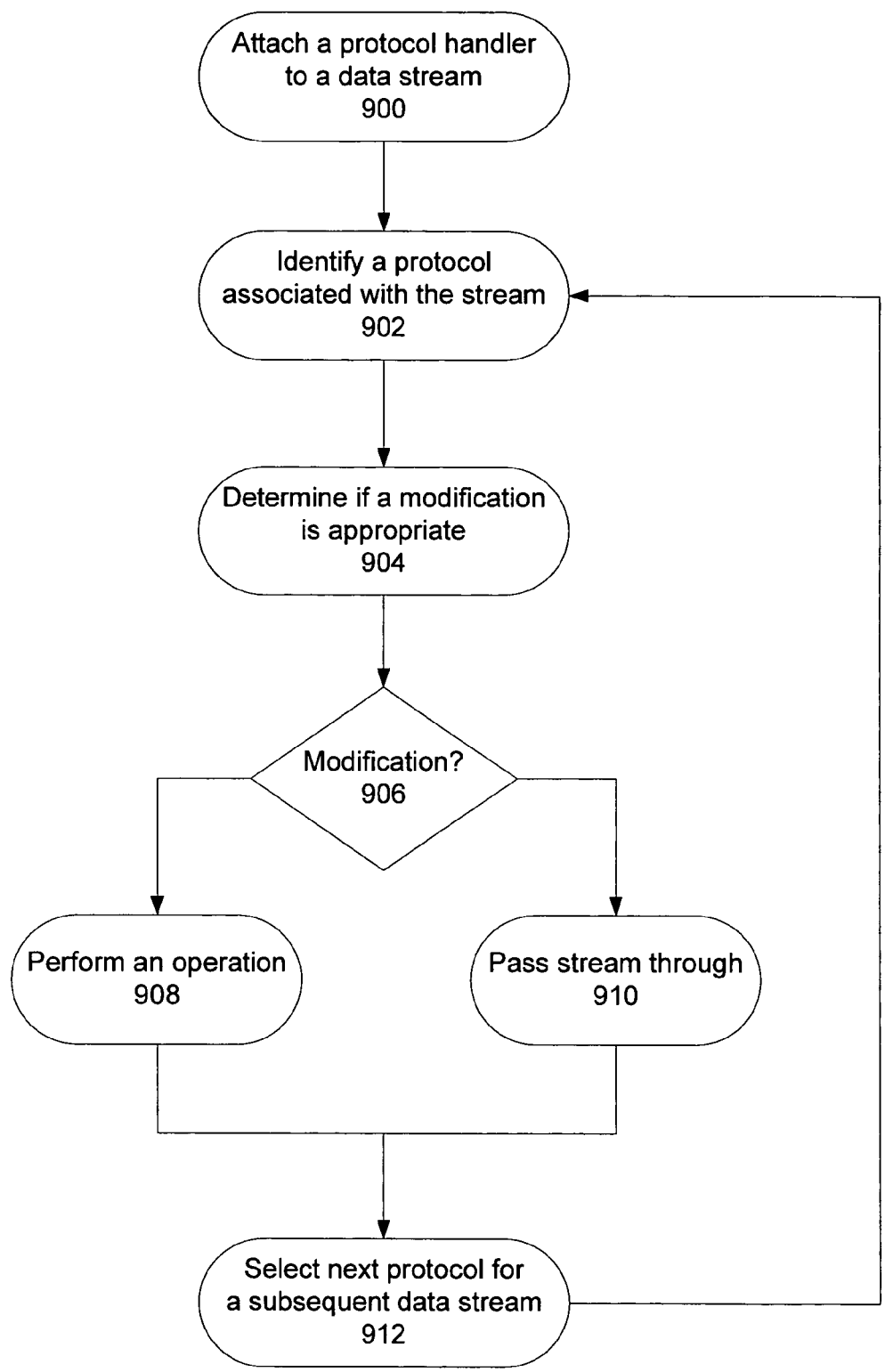
FIG. 9 provides in block diagram form an exemplary implementation of the presently disclosed subject matter.

Last, FIG. 9 illustrates in block diagram form an exemplary implementation of the disclosed subject matter. First, at block 900, a protocol handler may be attached to a data stream, whether the data stream is incoming or outgoing, whether from an application or to a local computing system, respectively. At block 902, upon attachment, the protocol associated with the data stream may be determined according so some algorithm, such as the one described with reference to FIG. 7.

At block 904, once the protocol has been identified by some handler, a determination can be made as to whether the data stream using the protocol should be modified or not. This determination may depend, at least in part, on some policy decision that may be communicated to a handler from some policy service—such as the one disclosed with reference to FIG. 2. At block 906, once the modification question is asked, at block 908 either a modification can be performed using some kind of an operation, such as delete, insert, replace, etc., or, alternatively, at block 910 the data stream may be passed though a protocol-level content filter. Once a data stream has been modified or not modified, at block 912, another selection of a subsequent protocol associated with a subsequent data stream may be performed, upon which, this process loops back to block 902.

It should be noted that the various techniques described herein may be implemented in connection with hardware or software or, where appropriate, with a combination of both. Thus, the methods and systems of the presently disclosed subject matter, or certain aspects or portions thereof, may take the form of program code (i.e., instructions) embodied in tangible media, such as floppy diskettes, CD-ROMs, hard drives, or any other machine-readable storage medium, where, when the program code is loaded into and executed by a machine, such as a computer, the machine becomes an apparatus for practicing the subject matter.

In the case of program code execution on programmable computers, the computing device may generally include a processor, a storage medium readable by the processor (including volatile and non-volatile memory and/or storage elements), at least one input device, and at least one output device. One or more programs that may utilize the creation and/or implementation of domain-specific programming models aspects of the present subject matter, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

Lastly, while the present disclosure has been described in connection with the preferred aspects, as illustrated in the various FIGS., it is understood that other similar aspects may be used or modifications and additions may be made to the described aspects for performing the same function of the present disclosure without deviating therefrom. For example, in various aspects of the disclosure, protocol-level content filtering mechanism was disclosed. However, other equivalent mechanisms to these described aspects are also contemplated by the teachings herein. Therefore, the present disclosure should not be limited to any single aspect, but rather construed in breadth and scope in accordance with the appended claims.

Summary

In summary, various systems, methods, computer readable media, and the like may be provided that embody the various aspects disclosed herein. For example a system may be provided for protocol-level filtering of content, where the system may comprise of a stream buffer for buffering traffic data and at least one handler, where the handler may be configured to detect a protocol associated with the traffic data in a port agnostic manner and an application agnostic manner. Moreover, the handler may be further configured to manipulate the traffic data.

Similarly, a method may be provided for filtering content at a protocol-level, where the method may comprise of attaching a first protocol detection component and a second protocol detection component to a stream upon establishing a connection with the stream, where the first protocol detection component and the second protocol detection component may be attached to the stream regardless of the type of port used by the stream and an application associated with the stream. Also, the method may comprise of determining a protocol associated with the stream, where the first protocol detection component and the second protocol detection component may establish the type of protocol that is associated with the stream. And, furthermore, the method may comprise of placing the first protocol detection component and the second protocol detection component in a state to modify the stream according to some policy.

As mentioned, in addition to the system and method that may be provided, a computer readable medium bearing tangible computer executable instructions may be provided, again, for the purpose of filtering content on a protocol-level basis. These instructions may allow for the detecting of a protocol using a set of handlers, where the detecting is independent of either a port used by a stream or an application from which the stream originates. Also, the instructions may allow for the modifying of the stream using one handler of the set of handlers if a determination is made that the stream should be modified based on the content of the stream, where the determination may be based on at least one policy decision.

The invention claimed is:

1. A system for protocol-level filtering of content, the system comprising:
   a stream buffer for buffering traffic data, wherein the buffered traffic data has a network protocol that is unknown;
   a plurality of handlers configured to:
      concurrently connect to the buffered traffic data;
      concurrently process the buffered traffic data;
      identify the unknown network protocol associated with the buffered traffic data using an identification handler, wherein the identification handler is at least one handler of the plurality of handlers, and wherein identification of the unknown network protocol is performed independent of information regarding a type of port used for the buffered traffic data or an application that generates the buffered traffic data;
      remove each handler of the plurality of handlers that is not the identification handler from the buffered traffic data upon identification of the unknown network protocol by the identification handler; and
      place the identification handler in a state to manipulate the buffered traffic data.

2. The system according to claim 1, wherein the identification handler is configured to identify an unknown network protocol by residing in a networking stack associated with the traffic data.

3. The system according to claim 1, wherein the stream buffer is an object configured to abstract at least one operation for the identification handler, allowing the identification handler to manipulate the traffic data buffered in the stream buffer.

4. The system according to claim 3, wherein the at least one operation is a replace operation for replacing at least one datum in the stream buffer.

5. The system according to claim 3, wherein the at least one operation is an insert operation for inserting at least one datum into the stream buffer.

6. The system according to claim 3, wherein the at least one operation is a delete operation for deleting at least one datum in the stream buffer.

7. The system according to claim 3, wherein the at least one operation is a read operation for reading at least one datum from the stream buffer.

8. The system according to claim 3, wherein the at least one operation is a complete operation for completing at least one datum in the stream buffer, wherein the completing entails claiming ownership of the traffic data by the identification handler using the complete operation.

9. The system according to claim 1, wherein each handler of the plurality of handlers is a protocol-specific object.

10. The system according to claim 1, further comprising a service that is configured to communicate at least one policy decision to the identification handler.

11. The system according to claim 1, wherein the stream buffer is configured to handle incoming traffic data sent to an application.

12. The system according to claim 1, wherein the stream buffer is configured to handle outgoing traffic data sent from an application.

13. The system according to claim 1, wherein the plurality of handlers and the stream buffer are managed by a content filter that is hosted on a networking stack.

14. A method for filtering content at a protocol-level, comprising acts of:
   concurrently attaching a first network protocol identification component and a second network protocol identification component to a stream having a type of network protocol associated therewith which is unknown, wherein the first network protocol identification component and the second network protocol identification component are concurrently attached to the stream regardless of a type of port used by the stream or an application that generates the stream;
   concurrently processing the stream by the first network protocol identification component and the second network protocol identification component;
   identifying the type of network protocol that is associated with the stream using an identifying network protocol identification component, wherein the identifying network protocol identification component is one of the first network protocol identification component and the second network protocol identification component, and wherein identification of the type of network protocol is performed independent of information regarding the type of port used for the stream or the application that generates the stream;
   removing an other of the first network protocol identification component and the second network protocol identification component from the stream upon identification of the type of network protocol associated with the stream, wherein the other of the first network protocol identification component and the second network protocol identification component is not the identifying network protocol identification component; and
   placing the identifying network protocol identification component in a state to modify the stream according to a policy.

15. The method according to claim 14, wherein concurrently attaching the first network protocol identification component and the second network protocol identification component is accomplished by a layer service provider that implements an interface between any available network protocol identification component and a networking stack hosting the layer service provider.

16. The method according to claim 14, further comprising modifying the stream according to an operation, wherein the operation comprises one of reading, inserting, replacing, deleting, and completing data in the stream.

17. The method according to claim 14, further comprising buffering the stream in a stream buffer placing the stream in condition for a modification.

18. A computer readable storage medium, the computer-readable storage medium not being a transient signal, the computer-readable storage medium comprising program instructions that are executable by a computer to perform a method for filtering content on a protocol-level basis, the method comprising acts of:
   concurrently connecting a stream having an unknown network protocol to each of a plurality of handlers;
   concurrently processing the stream by each handler;
   identifying a type of network protocol associated with the stream, using an identification handler, wherein the identification handler is at least one handler of the plurality of handlers, and wherein identification of the type of network protocol is performed independent of information regarding a type of port used for the stream or an application that generates the stream;
   removing each handler of the plurality of handlers that is not the identification handler from the stream upon identification of the unknown network protocol by the identification handler; and
   when the type of network protocol of the stream is identified, modifying the stream using the identification handler if a determination is made that the stream should be modified based on the content of the stream, wherein the determination is based on at least one policy decision.

19. The computer readable storage medium according to claim 18, further comprising program instruction that are executable by a computer to perform an act of communicating the at least one policy decision from a service to the plurality of handlers.

20. The computer readable storage medium according to claim 18, wherein the program instructions for modifying of the stream comprise program instructions for performing one or more of reading, inserting, replacing, deleting, and completing data in the stream.

* * * * *